United States Patent [19]

Link et al.

[11] 4,310,062

[45] Jan. 12, 1982

[54] HYDROSTATIC STEERING ARRANGEMENT

[75] Inventors: Erwin F. Link, Lansing; William L. Schubert, Downers Grove, both of Ill.

[73] Assignee: International Harvester Company, Chicago, Ill.

[21] Appl. No.: 114,431

[22] Filed: Jan. 22, 1980

[51] Int. Cl.³ .............................................. B62D 5/06
[52] U.S. Cl. ..................................... 180/139; 60/484; 91/420
[58] Field of Search ................ 180/134, 135, 136, 137, 180/138, 139; 60/484; 91/420

[56] References Cited

U.S. PATENT DOCUMENTS

| | | | |
|---|---|---|---|
| 3,468,126 | 9/1969 | Mercier | 91/420 |
| 4,006,663 | 2/1977 | Baatrup | 91/420 |
| 4,213,511 | 7/1980 | Rubenstein | 180/139 |

*Primary Examiner*—John P. Silverstrim
*Attorney, Agent, or Firm*—F. D. AuBuchon

[57] ABSTRACT

A steering circuit for an articulated farm tractor having front and rear frame sections pivotally interconnected with steering cylinders pivotally connected between the frame sections. An open center hydrostatic steering unit selectively directs hydraulic fluid from a pump to the steering cylinders and a pilot-operated, alternating check valve is interposed in the conduit connecting the steering mechanism with the steering cylinders.

3 Claims, 1 Drawing Figure

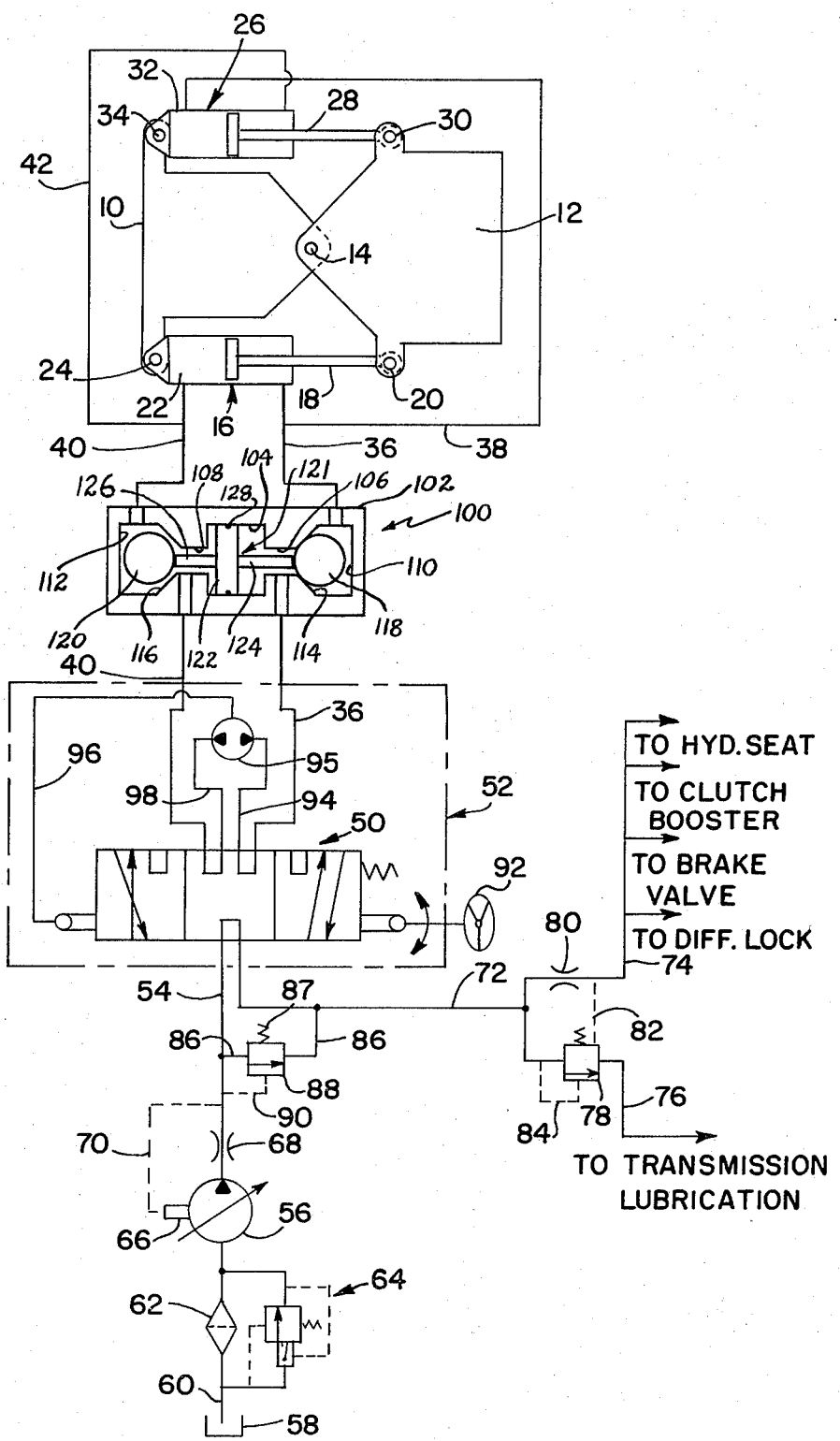

HYDROSTATIC STEERING ARRANGEMENT

BACKGROUND AND SUMMARY OF THE INVENTION

Articulated vehicles, i.e. vehicles in which steering is achieved by articulation of pivotally interconnected frame sections, generally have found a favorable reception in the market place for some time, including use in agricultural tractors. Open-center hydrostatic steering units have also been in common use for steering those agricultural tractors with front wheel steering, commonly referred to as Ackermann type steering. The Ackermann type steering, which is also used extensively on automobiles, can be designed, through proper angling of the kingpin, to provide a self-centering action, and drift, i.e. a slow wandering of the vehicle from the intended path, is generally not a problem. However, with articulated farm tractors, the Ackermann steering attributes are not available and the equivalent thereof is difficult to achieve with an inclined pin connection between the frame sections because the steering action itself can introduce stresses into the frame and can, to some extent, shift the distribution of vehicle weight between the front and rear axles. A straight or vertical pin connection is therefore desirable, as is the use of a hydrostatic steering unit because the latter permits limited, but usually effective, steering of a slowly moving vehicle with the engine dead.

The problem with using hydrostatic steering units, particularly the open-center type, is the slight leakage which is present in the hand pump of such units. When used on agricultural tractors the problem is even more pronounced because the draft load imposed on the tractor does not always have a line of action in the central plane of the tractor. This off-set loading tends to cause the tractor to drift, and with no centering action to off set it and with small but continuous leakage in the hand pump of the hydrostatic unit, the operator of the tractor must continually make directional corrections with the steering wheel.

It is, therefore, an object of the present invention to provide a hydrostatic steering arrangement for an articulated vehicle in which drift of the vehicle is minimized.

It is also an object of this invention to provide a hydrostatic steering arrangement for an articulated farm tractor in which steering corrections in order to compensate for offset draft loads imposed on such a tractor are reduced.

It is also an object of this invention to provide a simple and relatively inexpensive means which will permit use in an articulated farm tractor of a hydrostatic steering unit intended for use in a farm tractor with Ackermann type steering.

These and other objects, and many of the attendant advantages there of, will become more readily apparent upon a perusal of the following description and the accompanying drawing, wherein the sole FIGURE is a schematic of a hydrostatic steering system incorporating the present invention.

DESCRIPTION OF A PREFERRED EMBODIMENT

Referring now to the drawing, there is shown a tractor, as represented by a front frame section 10 and a rear frame section 12 which are hinged together by a pin 14 to permit steering of the tractor by articulation of the frame section. A steering jack 16 has its rod 18 pinned at 20 to the rear frame 12 and its cylinder 22 pinned at 24 to the front frame 10. A second steering jack 26 is positioned on the other side of the tractor and has its rod 28 pinned at 30 to the rear frame 12. The cylinder 32 of the jack 26 is pinned at 34 to the front frame 10. A conduit 36 connects between the rod end of the cylinder 22 and the steering valve 50, with a branch conduit 38 interconnecting the head end of cylinder 32 and the rod end of cylinder 22. A conduit 40 connects the steering valve 50 with the head end of cylinder 22, with branch conduit 42 interconnecting the rod end of cylinder 32 and the head end of cylinder 22. When hydraulic fluid pressure is directed through conduit 36 the jack 16 will be contracted and the jack 26 will be extended to effect steering in one direction, assuming that conduit 40 is simultaneously connected to the reservoir. Similarly, when hydraulic fluid pressure is directed through conduit 40 while conduit 36 is connected to reservoir, jack 16 will be extended and jack 26 contracted to effect steering in the other direction.

The steering valve 50 is part of an open center hydrostatic steering unit, indicated generally at 52, to be more fully described hereinafter. Hydraulic fluid under pressure is supplied to the steering valve 50 through conduit 54 by a variable displacement pump 56, which draws fluid from a reservoir 58 through a suction line 60 having a filter 62 interposed therein. A thermal bypass valve, indicated at 64, is connected to direct fluid around the filter 62 when the oil is cold and the viscosity is high, and when the filter 62 becomes so dirty that adequate fluid flow is not permitted. The thermal bypass valve may be of the type shown in U.S. patent application Ser. No. 5,626 filed Jan. 22, 1979 by Raymond D. Rubenstein, Russell E. Janke and Charles L. Rescorla and entitled "Filter Thermal By-pass Valve".

A compensator 66 is provided for the pump 56 to adjust its displacement. An orifice 68 is provided in the conduit 54 and a pilot line 70 connects between the compensator 66 and the conduit 54 downstream of the orifice 68. The flow from the pump 56 is controlled by the pump compensator 66. A signal is fed back through the pilot line 70. When a given pressure drop across orifice 68 results, the compensator 66 will cause the pump 56 to stroke back, i.e. reduce displacement, and then maintain that pressure drop. The pressure drop will be set to produce the required flow from the pump 56 for responsive steering. Hence, when engine speed is reduced, the pressure drop across the orifice 68 will be reduced and the signal through pilot line 70 will cause the compensator 66 to upstroke, i.e. increase displacement, to maintain the set pressure differential and the corresponding flow. In this way, required flow to the steering system is maintained up to the point at which the full displacement of the pump is reached, at which point steering flow will fall off in direct relationship to further reductions in the engine speeds.

A return conduit 72 connects with the steering valve 50. When the valve 50 is centered, as shown in the drawing, all the flow through supply conduit 54 is directed in the return conduit 72. Return conduit 72 branches into a primary branch conduit 74 and a secondary branch conduit 76. The primary branch conduit 74 supplies hydraulic fluid to a plurality of hydraulic apparatuses as indicated on the drawing, while the secondary branch conduits supplies lubrication to the transmission or if desired other hydraulic apparatuses of less critical importance.

A priority type flow divider valve 78 is provided in the secondary conduit 76. An orifice 80 is interposed in primary conduit 74 and a pilot line 82 connects between the valve 78 and the conduit 74 downstream of the orifice 80. A second pilot line 84 connects between the valve 78 and the conduit 76 upstream of the valve 78. The signal in pilot line 84 opposes to the signal from pilot line 82 and assures that the flow and conduit 72 will go to meet the requirements of the primary conduit 74 and secondary conduit 76 will receive that flow which is in excess of that needed by the primary conduit.

A bypass conduit 86 connects between the supply conduit 54 and return conduit 72. A bypass valve 88 is interposed in bypass conduit 86 and is biased by spring 87 to a closed position in which flow through conduit 86 is blocked. A pilot line 90 connects between the supply conduit 54 and the bypass valve 88, the signal from the pilot line 90 serving to urge the valve 88 against the bias of spring 87 to an open position. The spring 87 is set to permit the valve 88 to open at a pressure which is less than the system pressure set by the pressure portion of the compensator 66. Thus, the bypass valve 88 will be opened at a pressure slightly below that which would cause the pressure portion of compensator 66 to destroke the pump 56. Hence, when the operator holds the steering wheel so that flow from the steering valve 50 into the return conduit 72 is precluded, the bypass valve 88 will open and flow into the conduit 72 will be by way of the bypass conduit 86.

In operation, the pump compensator 66 will try to maintain some predetermined pressure drop across the orifice 68 which results in a predetermined flow through supply conduit 54 to the steering valve 50. When the steering valve is in its center neutral position, as shown in the drawing, the flow will go through the valve 50 and into return conduit 72 and from there to the branch conduit 74 and 76. The spring 87 will maintain the bypass valve 88 closed.

When the operator rotates the steering wheel, indicated at 92, the steering valve 50 will be shifted to the right or left, as viewed in the drawing. For example, if the valve 50 is shifted to the left, flow from conduit 54 will be directed to conduit 94 and will be metered through the hand pump 95 which is mechanically connected to rotate, though at a different rate, with the steering wheel 92; the line 96 representing the mechanical connection between the steering wheel 92 and the hand pump 95. The flow metered through the hand pump 95 is directed to conduit 98 which connects with the steering valve 50. In this position as shifted to the left, i.e. the right hand block in the schematic, the steering valve 50 connects the conduit 98 with the conduit 40. Fluid pressure in conduit 40 will cause the jack 16 to extend and the jack 26 to contract as explained previously, articulating the frames 10 and 12. The fluid exhausted from the rod end of jack 16 and the head end of jack 26 will be through conduit 36, through the steering valve 50 to the return conduit 72. Should the operator then hold the steering wheel 92 so that the hand pump is not rotating and therefore is incapable of metering any further flow to jack 16 and 26, flow in conduit 54 will be reduced momentarily. However, the flow compensator 66 is set to maintain a predetermined flow and as the predetermined flow cannot be accepted by the steering system 52 the pressure in conduit 54 will increase. The increase in pressure will be communicated by the bypass valve 88 through pilot line 90 causing the valve 88 to open. Flow through bypass conduit 86 will be established immediately between supply conduit 54 and return conduits 72, so that the branch conduit 74 and 76 will receive an adequate supply of hydraulic fluid under pressure.

The foregoing description is of the preferred form of constant flow hydraulic system, which is disclosed and claimed U.S. application Ser. No. 5626 filed Jan. 22, 1979 by Raymond D. Rubenstein and Charles L. Rescorla. Reference may be made thereto for a more complete description of how the constant flow hydraulic system operates.

An alternating check valve, indicated generally at 100, is interposed in the conduits 36 and 40. Without the valve 100, it will be seen that with the steering wheel 92 in the straight ahead position, and thus the valve spool 50 centered as shown, conduit 36 will have free communication with conduit 94 through the valve 50. Leakage around the hand pump 95 will therefore permit fluid flow from conduit 94 into conduit 98 and again through valve 50 to conduit 40. It is therefore apparent that without valve 100 a small flow in either conduit 40 or 36 may be communicated by virtue of leakage through the hand pump 95 to the other conduit. A tendency for such a flow will result when a draft load is imposed on the tractor tending to cause it to drift in one direction or the other.

The valve 100 has a valve body 102 with a central chamber 104 which connects by passages 106 and 108 with check valve chambers 110 and 112 respectively. The merger of the chambers 110 and 112 with the connected passages 106 and 108 forms the seats 114 and 116 against which check valve balls 118 and 120 may bear to seal their associated chamber 110 or 112 from the connected passage 106 and 108. A control piston assembly 121 has a central piston 122 with pins 124 and 126 affixed thereto and extending through the passages 106 and 108 respectively. The piston 122 is reciprocable within the chamber 104 and is provided with a seal 128 to preclude fluid transfer between passages 106 and 108. The overall length of the piston 122 and pins 124 and 126 is such that when one of the balls 118 and 120 is seated, the assembly 121 forces the other ball slightly off its seat. The lower portion of conduit 36 communicates with passage 106 and the upper portion of conduit 36 communicates with the chamber 110. The lower portion of conduit 40 communicates with passage 108, with the upper portion in communication with the chamber 112.

Rotation of the steering wheel 92 will shift the valve 50 directing fluid pressure from the pump 56 to one of the conduits 36 and 40, depending upon the direction of rotation of the wheel 92, while connecting the other of these conduits to reservoir through conduit 72. When pressure is present in the lower portion of conduit 36, the passage 106 will be pressurized causing the ball 118 to be unseated, while simultaneously acting on the piston 122 to shift the assembly 121 to the left as viewed in the drawing. The pin 126 will fully unseat the ball 120 permitting free flow of fluid expelled from the cylinders 22 and 32 through the conduit 40. When pressure appears in the lower portion of conduit 40, the passage 108 will be pressurized causing the ball 120 to be unseated and the assembly 121 will be shifted to the right whereupon the pin 124 will unseat the ball 118 for return of the fluid expelled from the cylinders 22 and 32. Thus, when pressure is directed to the cylinders from the pump 56 through the valve 50, both check valve balls 118 and 120 will be unseated permitting free flow of high pressure to the jacks 16 and 26 while permitting free flow of the return oil from these jacks.

Thermal expansion of the hydraulic fluid in the cylinders 22 and 32 precludes the use of two conventional check valves. Thermal expansion of the hydraulic fluid within the jacks 16 and 26 and in the conduits leading thereto, would force the oil past the seals around the rod 18 and 28 and/or around the piston seals, either case being undesirable. By providing an alternating check valve wherein one of the conduits 36 and 40 is always unblocked, a means is provided to accommodate the expansion of the fluid even when the tractor is not being steered. This expansion is accommodated by the excess volume of fluid being permitted to pass the opened one of the balls 118 and 120 and through the associated conduit 40 and 36 to the valve 50. Since the expansion is slow, the small amount of internal leakage in the spool of valve 50 will permit the excess to be drained to reservoir through conduit 72.

During normal steering operation when the operator is attempting to maintain a straight ahead path for the tractor, any unbalanced load which is attempting to articulate the tractor, will result in higher pressure being developed or induced in the upper portion of one of the lines 36 or 40. This induced pressure will serve to seat the ball in that one line and force the control piston assembly 121 to unseat the ball in the other line. Hence, the high induced pressure line will be blocked, although there is freedom of flow through the low pressure conduit with which the unseated ball is associated. Fluid passage into the other side of the jacks 16 and 26 is prevented by the seated one of the balls 118 and 120. It is therefore apparent that the increase in pressure induced into the hydraulic system through the cylinders such as occasioned by an offset draft load, will cause the valve 100 to seal what would normally be the return line for such induced steering action. Accordingly, corrective action by the operator through manipulation of the steering wheel 92 will be reduced.

It will be seen from the foregoing that the present invention provides a hydrostatic steering system for an articulated agricultural tractor that achieves all of the objectives recited previously. While a preferred embodiment of the invention has been described herein, it will be appreciated that various changes and modifications may be made therein without departing from the spirit of the invention as defined by the scope of the appended claims.

What is claimed is:

1. A steering system for minimizing drift induced by application of an external force to an articulated agricultural tractor comprising:
   at least one steering cylinder for articulating said tractor;
   a reservoir on said tractor;
   a pump connected to draw fluid from said reservoir;
   a hydrostatic steering unit for selectively directing flow from said pump to a high pressure side of said cylinder and connecting the low pressure side to reservoir; and
   an alternating check valve interposed between said unit and said cylinder which permits free communication between said cylinder and each of said pump and reservoir upon actuation of said unit but which blocks communication only with the high pressure side when the pressures are induced by said external force.

2. A steering system for an articulated farm tractor which reduces the corrective steering action that need be taken by an operator to compensate for drift induced by off-center loading on the tractor, said tractor having front and rear frame sections pivotally connected to define an axis of articulation; said system comprising:
   a pair of steering cylinders connected between said frame sections on either side of said axis;
   conduit means connecting the rod and head end of one cylinder respectively with the head and rod end of the other cylinder;
   a reservoir on said tractor;
   a pump connected to draw fluid from said reservoir;
   a hydrostatic steering unit connected to direct flow from said pump to said cylinders, said unit when in the straight ahead position providing a small flow path having a high pressure side and a low pressure side between the head and rod ends of said one cylinder;
   an alternating check valve interposed between said unit and said cylinders to interrupt only the high pressure side of said path in said straight ahead position, but permitting free communication between the cylinders and the unit when operation of said unit is other than straight ahead.

3. A steering system according to claim 1 or 2 wherein said alternating check valve comprises:
   a valve body having a central chamber;
   a pair of passages communicating with said chamber;
   a pair of ball valves capable of sealing the end of each passage;
   a control piston assembly having a length such that only one of said ball valves at a time is able to seal its associated passage.

* * * * *